United States Patent
Lee et al.

(10) Patent No.: US 9,742,893 B2
(45) Date of Patent: Aug. 22, 2017

(54) MOBILE TERMINAL WITH TERMINAL CASE AND OPERATING METHOD THEREOF

(71) Applicant: LG ELECTRONICS INC., Seoul (KR)

(72) Inventors: Byunghwa Lee, Seoul (KR); Hyunho Choi, Seoul (KR); Kyungtae Yang, Seoul (KR); Seoungho Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 14/266,305

(22) Filed: Apr. 30, 2014

(65) Prior Publication Data

US 2015/0094119 A1    Apr. 2, 2015

(30) Foreign Application Priority Data

Sep. 27, 2013    (KR) .................. 10-2013-0115392

(51) Int. Cl.
*H04M 1/00* (2006.01)
*H04M 1/725* (2006.01)
(Continued)

(52) U.S. Cl.
CPC ...... *H04M 1/72519* (2013.01); *G06F 1/1628* (2013.01); *G06F 3/0484* (2013.01);
(Continued)

(58) Field of Classification Search
CPC ............ H04M 1/72519; H04M 1/0266; G06F 3/0488; G06F 3/0484; G06F 1/1628
See application file for complete search history.

(56) References Cited

U.S. PATENT DOCUMENTS

| | | |
|---|---|---|
| 5,990,874 A | 11/1999 | Tsumura et al. |
| 2006/0256090 A1 | 11/2006 | Huppi |

(Continued)

*Primary Examiner* — Idowu O Osifade
(74) *Attorney, Agent, or Firm* — Dentons US LLP

(57) ABSTRACT

A mobile terminal and an operating method thereof are provided. The mobile terminal includes a terminal body; and a terminal case coupled to the terminal body to cover at least a front surface of the terminal body, the terminal body comprising: a display unit disposed at the front surface thereof, to display an image; a sensing unit sensing whether the front surface of the display unit is covered by the terminal case; and a controller controlling an operation of the display unit, and the terminal case comprising: a terminal coupling part to which the terminal body is coupled; a front cover part rotatably coupled to the terminal coupling part to cover the front surface of the terminal body and including a window for allowing a light emitted from the display unit to be transmitted; and a pattern part provided at a portion of the front cover part corresponding to a region other than the window, wherein the display unit is defined by an exposed region corresponding to the window and a hidden region corresponding to the region other than the window, wherein when a signal to turn on the display unit is input in a state where the front cover part covers the front surface of the display unit, the controller is configured to display a user interface at least in the hidden region, to enable a user input through a manipulation of the pattern part.

14 Claims, 13 Drawing Sheets

(51) Int. Cl.
*G06F 1/16* (2006.01)
*G06F 3/0484* (2013.01)
*G06F 3/0488* (2013.01)
*H04M 1/02* (2006.01)

(52) U.S. Cl.
CPC ........ *G06F 3/0488* (2013.01); *H04M 1/0266* (2013.01); *G06F 2200/1634* (2013.01)

(56) References Cited

U.S. PATENT DOCUMENTS

| | | | |
|---|---|---|---|
| 2010/0056222 A1* | 3/2010 | Choi | H04M 1/0245 |
| | | | 455/566 |
| 2010/0238119 A1* | 9/2010 | Dubrovsky | G06F 1/1626 |
| | | | 345/169 |
| 2012/0235935 A1* | 9/2012 | Ciesla et al. | 345/173 |
| 2013/0076614 A1* | 3/2013 | Ive et al. | 345/156 |
| 2013/0242505 A1 | 9/2013 | Nguyen et al. | |
| 2014/0198070 A1* | 7/2014 | Won | G06F 3/017 |
| | | | 345/173 |
| 2015/0062097 A1* | 3/2015 | Chung | G06F 1/1626 |
| | | | 345/184 |

* cited by examiner

MOBILE TERMINAL WITH TERMINAL CASE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2013-0115392 filed on Sep. 27, 2013 which is hereby incorporated by reference in its entirety.

BACKGROUND

The present disclosure relates to a mobile terminal and an operating method thereof.

Terminals may be divided into mobile/portable terminals and stationary terminals according to portability.

Between them, the mobile terminals are being implemented as a multimedia type equipped with complex functions, such as playback of music or video files, or broadcast reception, etc., according to diversification of the functions.

Recently, most of terminals are designed to enable a touch input through a touch panel prepared on the front side of a display unit, and due to various additional functions, use frequency thereof by a user is increased in a daily life.

Accordingly, risk that a configuration such as a touch screen is damaged by an external impact like a drop is also increased.

Therefore, in order to protect the mobile terminal from an external impact, various terminal cases from which the mobile terminals are detachable are widely used. Among typical terminal cases, there is provided a type capable of covering the display unit for protecting the display unit of the mobile terminal.

However, for executing a call function or other functions, a part covering the display unit is necessary to be open to expose the display unit.

SUMMARY

Embodiments provide a mobile terminal and an operating method thereof enabling various functions of a mobile terminal to be executed without opening a terminal case.

In one embodiment, A mobile terminal, comprising: a terminal body; and a terminal case coupled to the terminal body to cover at least a front surface of the terminal body, the terminal body comprising: a display unit disposed at the front surface thereof, to display an image; a sensing unit sensing whether the front surface of the display unit is covered by the terminal case; and a controller controlling an operation of the display unit, and the terminal case comprising: a terminal coupling part to which the terminal body is coupled; a front cover part rotatably coupled to the terminal coupling part to cover the front surface of the terminal body and including a window for allowing a light emitted from the display unit to be transmitted; and a pattern part provided at a portion of the front cover part corresponding to a region other than the window, wherein the display unit is defined by an exposed region corresponding to the window and a hidden region corresponding to the region other than the window, wherein when a signal to turn on the display unit is input in a state where the front cover part covers the front surface of the display unit, the controller is configured to display a user interface at least in the hidden region, to enable a user input through a manipulation of the pattern part.

In one embodiment, an operating method of a mobile terminal that is coupled to a terminal case which covers a display unit on a front surface of the mobile terminal with a front cover unit comprising a window and a pattern part, the operating method comprising: obtaining a user input to turn on the display unit; determining whether the front surface of the mobile terminal is covered by the front cover part, when the user input to turn on the display unit is obtained; determining whether to enter a total close mode or enter a partial close mode, when the front surface of the mobile terminal is covered by the front cover part; displaying a user interface in the total close mode in a hidden region which is a region other than an exposed region corresponding to the window in the display unit, when the entered mode is the total close mode; touching the user interface in the total close mode displayed in the hidden region through a manipulation of the pattern part; obtaining a user input by the touch of the user interface in the total close mode in the hidden region; and displaying information, which corresponds to the touch input through the hidden region, through an exposed region corresponding to the window in the display unit.

In another embodiment, an operating method of a mobile terminal that is coupled to a terminal case which covers a display unit on a front surface of the mobile terminal with a front cover unit comprising a window and a pattern part, the operating method comprising: obtaining a user input to turn on the display unit; determining whether the front surface of the mobile terminal is covered by the front cover part, when the user input turning on the display unit is obtained; displaying a user interface enabling a user to select any one of a plurality of user interfaces in an exposed region corresponding to the window in the display unit, when the front surface of the mobile terminal is covered by the front cover part; obtaining a touch input to select any one user interface among the plurality of user interfaces through the exposed region; displaying the selected user interface through the hidden region; obtaining a user input by touching the user interface displayed in the hidden region through a manipulation of the pattern part; and displaying information, which corresponds to the obtained user input in the exposed region.

The details of one or more embodiments are set forth in the accompanying drawings and the description below. Other features will be apparent from the description and drawings, and from the claims.

DETAILED DESCRIPTION OF THE EMBODIMENTS

Figure 1:
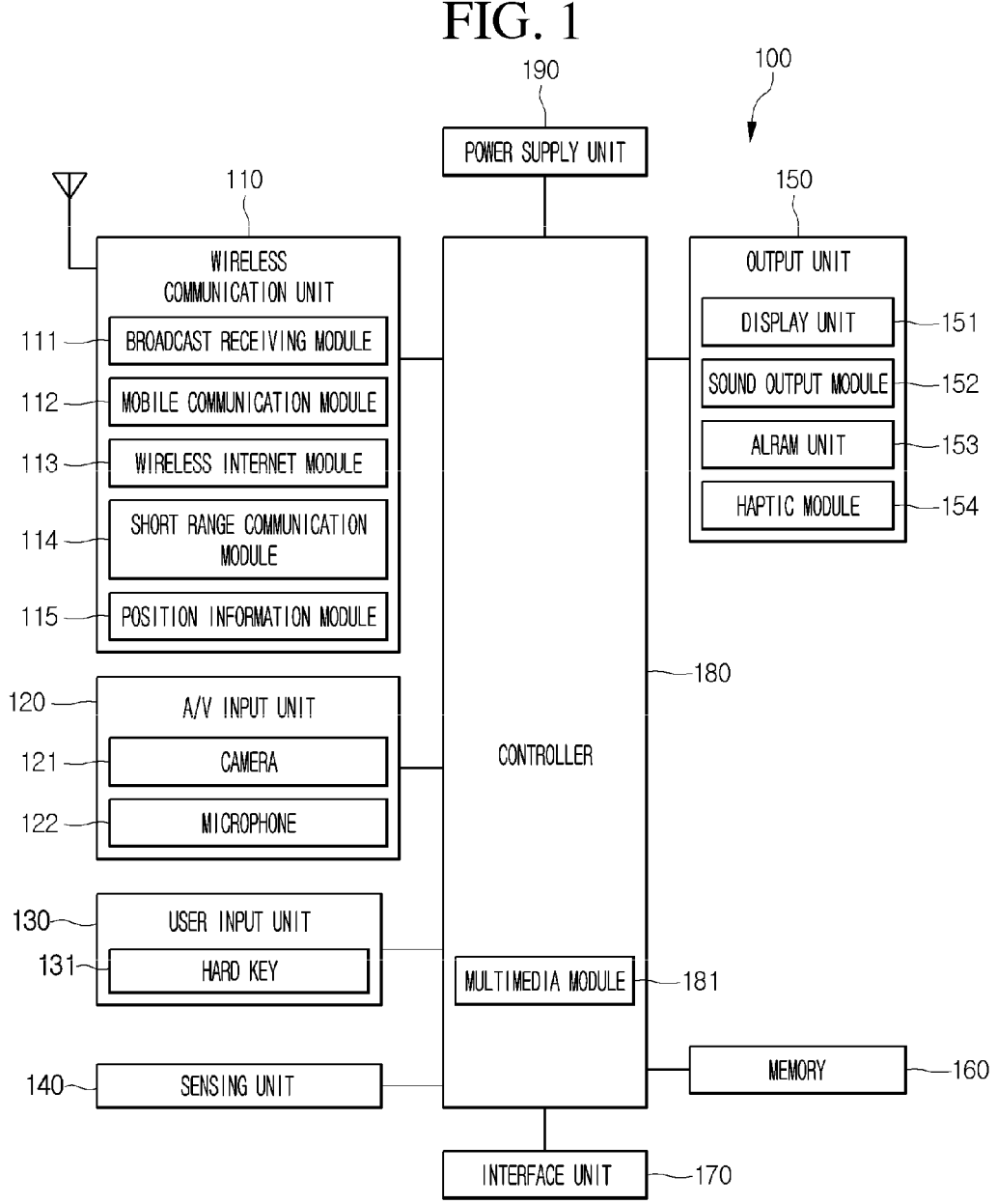
FIG. 1 is a block diagram illustrating a configuration of a mobile terminal according to an embodiment.

Reference will now be made in detail to the embodiments of the present disclosure, examples of which are illustrated in the accompanying drawings.

In the following description, usage of suffixes such as 'module', 'part' or 'unit' used for referring to elements is given merely to facilitate explanation of the present invention, without having any significant meaning by itself. In describing the present invention, a detailed description of known functions and configurations will be omitted when it may obscure the subject matter of the present invention. The accompanying drawings are used to help easily understand the technical idea of the present invention and it should be understood that the idea of the present invention is not limited by the accompanying drawings. However, the present invention should not be construed as limited to specific disclosure forms, and the spirit and scope of the invention should be understood as incorporating various modifications, equivalents and substitutions.

It will be understood that although the terms "first", "second", etc. may be used herein to describe various components, these components should not be limited by these terms. These components are only used to distinguish one component from another.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

As used herein, the singular forms "a," "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

A mobile terminal and an operating method thereof according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

A mobile terminal described herein may include a mobile phone, a smart phone, a notebook computer, a digital broadcast terminal, personal digital assistants (PDA), a portable multimedia player (PMP), or a navigator. However, it can be easily understood by those skilled in the art that a configuration according to an embodiment described herein may also be applied to a stationary terminal, such as a digital TV, or a desktop computer, except a case applicable only to a mobile terminal.

FIG. 1 is a block diagram of a terminal body in a mobile terminal according to an embodiment.

The terminal body 100 may include a wireless communication unit 110, an audio/video (A/V) unit 120, a user input unit 130, a sensing unit 140, an output unit 150, a memory 160, an interface unit 170, a controller 180, and a power supply unit 190. The elements shown in FIG. 1 are not essential, and the mobile terminal may have more or less elements than them.

Descriptions about the elements are provided below with reference to FIG. 1.

The wireless communication unit 110 may include one or more modules enabling wireless communication between the terminal body 100 and a wireless communication system, or between the terminal body 100 and a network in which the terminal body 100 exists. For example, the wireless communication unit 110 may include a broadcast reception module 111, a mobile communication module 112, a wireless internet module 113, a short range communication module 114, and a position information module 115.

The broadcast reception module 111 receives a broadcast signal and/or broadcast related information from an external broadcast management server through a broadcast channel.

The broadcast channel may include a satellite channel, or a ground-wave channel. The broadcast management server may mean a server creating and transmitting a broadcast signal and/or broadcast related information or a server receiving and transmitting a pre-created broadcast signal and/or broadcast related information to a terminal. The broadcast signal may include not only a TV broadcast signal, a radio broadcast signal, and a data broadcast signal, but also a broadcast signal of a type having a data broadcast signal combined to a TV broadcast signal or a radio broadcast signal.

The broadcast related information may mean information related to a broadcast channel, a broadcast program, or a broadcast service provider. The broadcast related information may also be provided through a mobile communication network. In this case, the broadcast related information may be received by the mobile communication module 112.

The broadcast related information may exist in various types, for example, an electronic program guide (EPG) of digital multimedia broadcast (DMB), or an electronic service guide (ESG) of digital video broadcast-handheld (DVB-H).

The broadcast reception module 111 may receive a digital broadcast signal using a digital broadcast system, such as DMB-terrestrial (DMB-T). DMB-satellite (DMB-S), media forward link only (MediaFLO), DVB-H, or integrated services digital broadcast-terrestrial (ISDB-T). It is natural that the broadcast reception module 111 may be configured to be proper not only to the above-described digital broadcast system, but also to other broadcast systems.

The broadcast signal and/or broadcast related information received through the broadcast reception module 111 may be stored in the memory 160.

The mobile communication module 112 transmits and receives a wireless signal with at least one of a base station, an external terminal, and a server on the mobile communication network. The wireless signal may include a voice call signal, a video call signal, or various types of data according to transmission and reception of a text/multimedia message.

The wireless internet module 113 refers to a module for wireless internet access, and may be embedded in the mobile terminal 100 or disposed externally. As the wireless internet technology, wireless LAN (Wi-Fi), wireless broadband (Wibro), world interoperability microwave access (Wimax), or high speed downlink packet access (HSDPA) may be employed.

The short range communication module 114 refers to a module for short-range-communication. As the short range communication technology, Bluetooth, radio frequency identification (RFID), infrared data association (IrDA), ultra wideband (UWB), or ZigBee may be employed.

The position information module 115 is a module for obtaining a position of a mobile terminal. As a representative example, there is a global position system module (GPS) module.

The A/V input unit 120 is for inputting an audio signal or a video signal, and may include a camera 121 and a microphone 122. The camera 121 processes a still image or image frames of a video obtained by an image sensor in a video call mode or a capturing mode. The processed image frames may be displayed on the display unit 151.

The image frames processed by the camera 121 are stored in the memory 160 or transmitted externally through the wireless communication unit 110. Two or more cameras 121 may be prepared according to use environment.

The microphone 122 receives external sound signals in a call mode, a recording mode, or a speech recognition mode and processes the sound signals to an electrical speech data. The processed speech data may be converted into a transmittable form and output to a mobile communication base station through the mobile communication module 112. Various noise removal algorithms may be implemented in the microphone 122, wherein the noise is generated in a process of receiving the external sound signals.

The user input unit 130 generates input data for allowing a user to control operations of the terminal. The user input unit 130 may be configured with a key pad, a dome switch, a touch pad (static pressure/static electricity), a jog wheel, a jog switch, etc. The user input unit 130 may include a hard key 131, such as a home key or a side key, etc.

The sensing unit 140 senses a current state of the terminal body 100, such as a position of the terminal body 100, whether there is a user contact, orientation of the mobile terminal, or acceleration/deceleration of the mobile terminal, and generates a sensing signal for controlling operations of the terminal body 100.

Furthermore, the sensing unit 140 may include a proximity sensor. As an example of the proximity sensor, a hall sensor may be used. In addition, as a proximity sensor except a magnetic proximity sensor like the hall sensor, an optical proximity sensor, a capacitive proximity sensor, an Eddy current proximity sensor, an ultrasonic proximity sensor, or an inductive proximity sensor may also be used.

Furthermore, the sensing unit 140 may sense an On/Off state of the display unit 151 to be described later, and also sense whether the power is provided by the power supply unit 190, or whether an external device is combined with the interface unit 170.

In addition, the sensing unit 140 may sense whether the terminal case 200 to be described later is detached and the terminal case 200 is open.

The output unit 150 is for generating an output related to vision, sense of hearing, or sense of touch, and may include the display unit 151, a sound output module 152, an alarm unit 153, and a haptic module 154.

The output unit 150 is for generating an output related to vision, sense of hearing, or sense of touch, and may include the display unit 151, a sound output module 152, an alarm unit 153, and a haptic module 154.

The display unit 151 displays information processed in the terminal body 100. For example, when the terminal body 100 is in a call mode, a user interface (UI) or graphic user interface (GUI) related to a call is displayed. When the terminal body 100 is in a video call mode or a capturing mode, a captured or/and received image, or a UI or a GUI is displayed.

The display unit 151 may include at least any one of a liquid crystal display (LCD), a thin film transistor-liquid crystal display (TFT-LCD), an organic light-emitting diode (OLED), a flexible display, and a 3-dimensional display.

Some displays among them may be configured with a transparent type or light-transmissive type for seeing the outside therethrough. This may be referred to as a transparent display, and a representative example of the transparent display is a transparent OLED (TOLED). A rear structure of the display unit 151 may also be configured with a light-transmissive structure. Due to this structure, a user may see objects positioned in the rear side of the terminal body through a region occupied by the display unit 151 of the terminal body.

There may be two or more display units 151 according to an implementation type of the terminal body 100. For example, a plurality of display units may be disposed separately or in an integrated type on one surface, or respectively on different sides of the terminal body 100.

When the display unit 151 and a sensor (hereinafter, referred to as a 'touch sensor') sensing a touch operation form a mutual layered structure (hereinafter, referred to as 'touch screen'), the display unit 151 may also be used as an input device other than an output device. The touch sensor may have a form of, for example, a touch film, a touch sheet, or a touch pad.

The touch sensor may be configured to convert a pressure applied to a specific portion of the display unit 151 or a capacitance change occurring on a specific portion of the display unit 151 into an electrical input signal. The touch sensor may be configured to detect a pressure upon being touched as well as a touched position and area.

When there is a touch input on the touch sensor, a corresponding signal(s) is transmitted to a touch controller. The touch controller processes the signal(s) and transmits the processed signal(s) to the controller 180. Accordingly, the controller 180 may detect which region on the display unit 151 is touched.

The sound output module 152 may output audio data received from the wireless communication unit 110 in call reception, a call mode, a recording mode, a speech recognition mode, or a broadcast reception mode, or audio data stored in the memory 160. The sound output module 152 may also output a sound signal (for example, a call reception sound, or a message reception sound, etc.) related to a function performed in the mobile terminal 100. The sound output module 152 may include a receiver, a speaker, or a buzzer.

The alarm unit 153 may output a signal for notifying an event occurrence of the terminal body 100. As an example of an event occurred in the mobile terminal, there is call signal reception, message reception, a key signal input, or a touch input, etc. The alarm unit 153 may also output a signal for notifying an event occurrence with different types, for example, vibration, other than a video signal or an audio signal. Since the video signal or audio signal may be output through the display unit 151 or the sound output module 152, they 151 and 152 may be classified into a part of the alarm unit 153.

The haptic module 154 generates various effects of touch senses that a user may feel. A representative example of the touch sense effect generated by the haptic module 154 is vibration. The strength and pattern of vibration generated by the haptic module 154 are controllable. For example, different vibrations may be synthesized to be output or sequentially output.

The haptic module 154 may generate various touch sense effects, other than the vibration, such as effect of a pin array moving vertically with respect to contact skin surface, jet force or suction force of air through a jet orifice or an air inlet, graze for skin surface, a contact of an electrode, or stimulus of an electrostatic force, or an effect of reproduction of cold and warmth by using devices capable of heat absorption or generation.

The haptic module 154 may be implemented to allow a user to feel a touch sense effect through muscle sense of fingers or arms as well as to deliver the touch sense effect through a direct contact. Two or more haptic modules 154 may be prepared according to a configuration aspect of the mobile terminal 100.

The memory 160 may store a program for operation of the controller 180 and temporarily store input/output data (fro example, a phone book, messages, still images, videos). The memory 160 may store data related to vibrations and sounds of various patterns output during the touch input on the touch screen.

The memory 160 may include at least one type of recording medium of a flash memory type, a hard disk type, a multimedia card micro type, a card type memory (for example, an SD or XD memory, etc.), a random access memory (RAM), a static RAM (SRAM), a read-only memory (ROM), an electrically erasable programmable read-only memory (EEPROM), a programmable read-only memory (PROM), a magnetic memory, a magnetic disk, or an optical disc. The terminal body 100 may operate in relation to a web storage that performs a storage function of the memory 160 on the internet.

The interface unit 170 plays a role of passage with all external devices connected to the terminal body 100. The interface unit 170 receives data from the external devices, receives power and delivers the power to each element inside the terminal body 100, or allows data inside the terminal body 100 to be transmitted to the external devices.

The identification module is a chip storing various types of information for authenticating use authority of the terminal body 100, and may include a user identity module (UIM), a subscriber identity module (SIM), or a universal subscriber identity module (USIM), etc. The device having the identification module therein (hereinafter, referred to as 'identification device') may be manufactured in a smart card format. Accordingly, the identification device may be connected to the terminal 100 through a port.

The interface unit 170 may be a passage through which, when the mobile terminal is connected to an external cradle, power is supplied from the cradle to the mobile terminal 100, or various command signals input through the cradle by the user are delivered to the mobile terminal 100. The various command signals input from the cradle or the power may operate as a signal for recognizing that the mobile terminal 170 is exactly mounted to the cradle.

The controller 180 typically controls overall operations of the mobile terminal. For example, controls and processes related to a voice call, data communication, or a video call are performed. The controller 180 may include a multimedia module 181 for multimedia playback. The multimedia module 181 may be implemented inside the controller 180 or separately from the controller 180.

The controller 180 may perform pattern recognition processing for recognizing a hand-written input or drawing input performed on the touch screen as a letter and an image respectively.

The power supply unit 190 receives external power and internal power under a control of the controller 180 and supplies power necessary for operating each element.

Various embodiments described herein may be realized on a computer or similar device readable recording medium by using software, hardware, or a combination thereof. According to hardware realization, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions. In some cases, those embodiments may be implemented by the controller 180.

According to software realization, embodiments such as processes or functions may be implemented with a separate software module allowing at least one function or operation to be performed. The software code may be implemented by a software application written in a proper program language. The software code may be stored in the memory 160 and performed by the controller 180.

Figure 2:
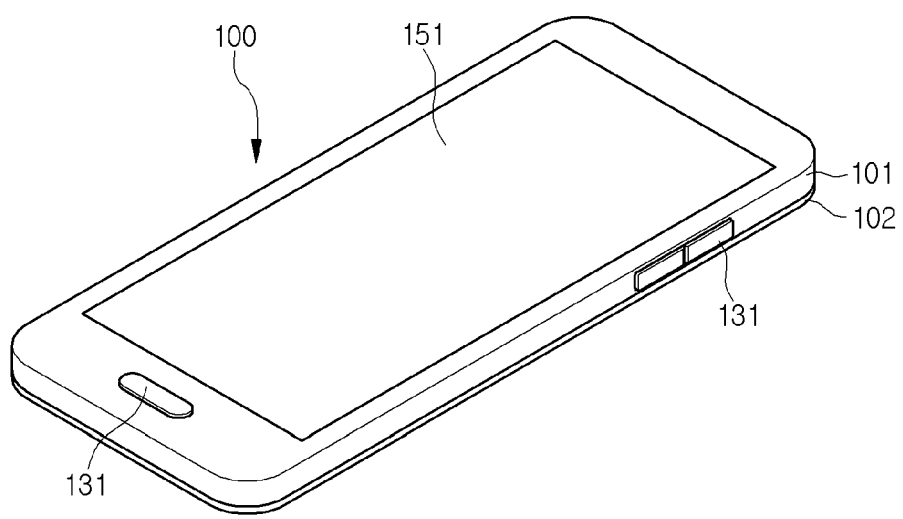
FIG. 2 is a perspective view schematically illustrating a terminal body of the mobile terminal according to an embodiment.

FIG. 2 is a perspective view illustrating a terminal body of a mobile terminal according to an embodiment.

Referring to FIG. 2, the terminal body 100 according to an embodiment, besides the above-described configuration, further includes housings 101 and 102. The housings 101 and 102 include a front housing 101 and a rear housing 102 coupled to a rear side of the front housing 101.

The front housing 101 supports the display unit 151 from the rear side, and covers a front surface edge and a part of side surface of the terminal body 100.

The rear housing 102 is coupled to the rear side of the front housing 101, and covers the side surface of the terminal body 100.

Various electronic components necessary for driving the mobile terminal are embedded between the front and rear housings 101 and 102. For example, a main board including a printed circuit board (PCB) and various devices mounted to the PCB may be embedded therebetween. Accordingly the rear housing 102 may cover various components including the main board in the rear side.

Furthermore, when a middle frame (not shown) is prepared between the front and rear housings 101 and 102, various electronic components may be embedded between the front housing 101 and the middle frame, and the rear housing 102 may be prepared to be detachable in order to cover an outside of a battery. That is, the middle frame may cover various components including the main board in the rear side, and the battery may be mounted to a battery reception unit formed in the middle frame. In addition, the rear housing 102 may cover the middle frame and the battery in the rear side.

On the other hand, hard keys 131 are exposed outside the housings 101 and 102. The hard keys 131 include a home key and a side key, etc. and deliver a signal therefrom to the controller 180, when being pressed by a user with a physical force.

Figure 3:
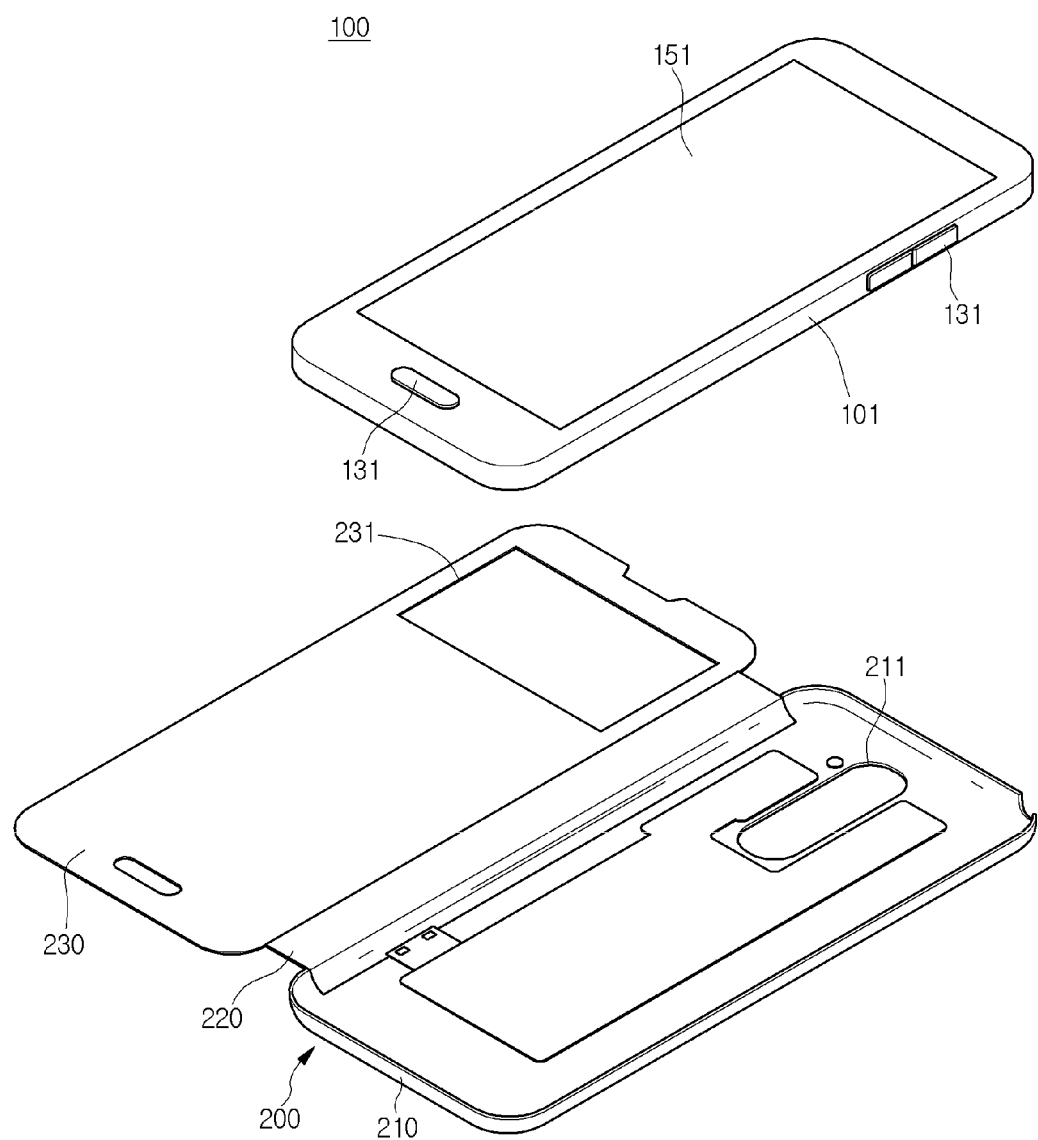
FIG. 3 schematically illustrates a mobile terminal and a terminal case according to an embodiment.

FIG. 3 illustrates a mobile terminal according to an embodiment with the terminal body 100 being separated from the terminal case 200.

The configuration of the terminal body 100 is the same as described above, and hereinafter, a configuration of the terminal case 200 from which the terminal body 100 is detachable is described.

The terminal case 200 includes a terminal coupling part 210 from which the terminal body 100 is detachable, and a front cover part 230 coupled to the terminal coupling part 210 in a foldable way and able to cover the front surface of the terminal body 100.

Furthermore, the terminal case 200 further includes a connecting part 220 connecting the terminal coupling part 210 and the front cover part 230.

In detail, the terminal coupling unit 210 is formed to be able to cover the side surface and the rear surface of the terminal body 100 and has the front side of an opened shape in order for the terminal body 100 to be detachable. Accordingly, a space in which the terminal body 100 may be seated is formed inside the terminal coupling part 210. Furthermore, a rear cut part 211 may be formed to allow a camera or other manipulation buttons prepared in the rear surface of the terminal body 100 to be exposed.

The terminal coupling part 210 may be coupled to the rear side of the rear housing 102 or coupled directly and detachably to the front housing 101 instead of the rear housing 102. In addition, when the middle frame is prepared, the terminal coupling part may be detachably coupled to the middle frame.

FIG. 3 illustrates an embodiment replacing the rear housing 102 of the terminal body 100 with the terminal coupling unit 210 of the terminal case 200. That is, the rear housing 102 is separated from the mobile terminal shown in FIG. 2 and, as shown in FIG. 3, the terminal coupling part 210 may replace the rear housing 102 and be coupled thereto. However, as described above, the coupling is not limited to this type, and the terminal coupling part 210 may be coupled to the rear side of the rear housing 102. When the terminal coupling part 210 is coupled to the rear side of the rear housing 102 of the terminal body 100, the mobile terminal means only the terminal body 100 and it may be interpreted that the terminal case 200 is a separate member detachable from the mobile terminal.

The front cover part 230 may have a thin plate shape and a shape corresponding to the front surface of the terminal body 100. A window 231 is prepared in the front cover part 230. The window 231 is transparently formed to allow a light emitted through the display unit 151 to be penetrable. The window 231 may be a hole that is formed by cutting a part of the front cover unit 230. In addition, a transparent film sheet can be coupled to and cover the hole for the window 231. Accordingly, when the window 231 is cut to penetrate in the depth direction of the front cover part 230, a user may see a picture or an image displayed on the display unit 151 of the terminal body 100, or make a touch input on the display unit 151 through the window 231. A magnetic material may be mounted to the front cover part 230. When the magnetic material is mounted to the front cover part 230, a magnetic field becomes changed according to an open or closed state of the front cover part 230. The sensing unit 140 prepared in the terminal body 100 may detect whether the front cover part 230 is open or closed through this magnetic field change. However, whether the front cover part 230 is open or closed is not always detected by a sensor using the magnetic material, but may be detected by another kind of proximity sensor or other sensors. Accordingly, there is not any limit in a method that the sensing unit 140 senses whether the front cover part 230 is open or closed.

The connecting part 220 connects the terminal coupling part 210 and the front cover part 230. Accordingly, one end of the connecting part 220 is coupled to the terminal coupling part 210 and the other end is coupled to the front cover part 230. The connecting part 220 is formed of a flexible material. Accordingly, in a state where the terminal coupling part 210 is coupled to the terminal body 100, the front cover unit 230 may be positioned so that the rear surface thereof contacts with the front surface of the terminal body 100, or positioned by rotating about 180 degrees so that the front surface thereof contacts with the rear surface of the terminal coupling unit 210.

Figure 4:
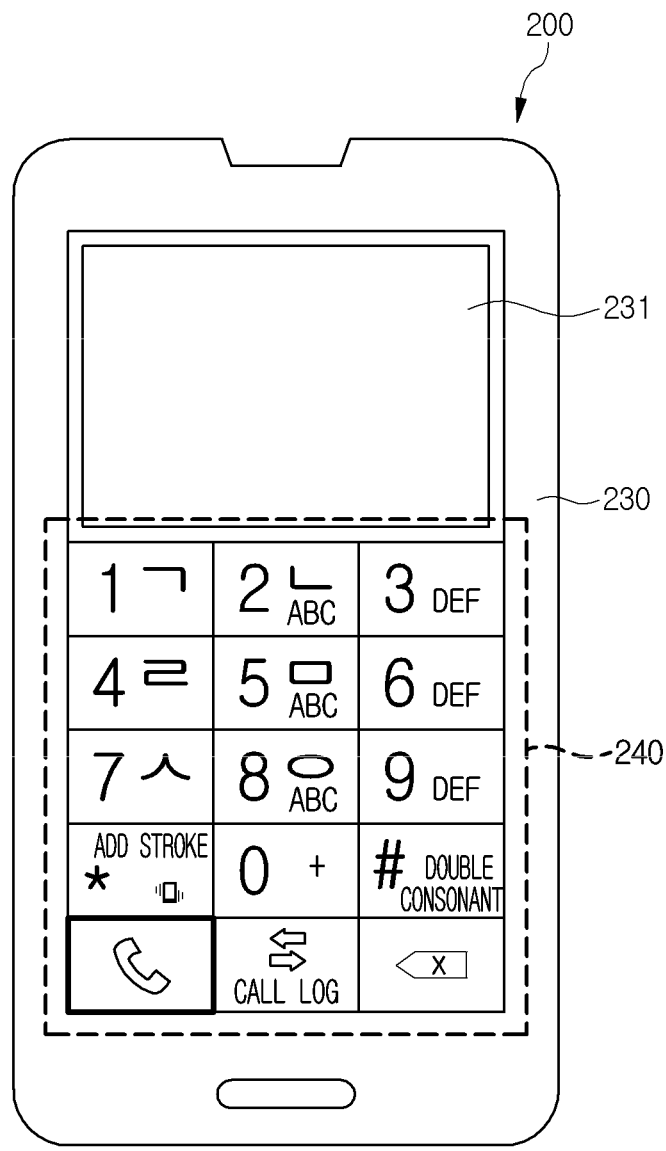
FIG. 4 illustrates a front surface of a terminal case according to an embodiment.

FIG. 4 illustrates the front surface of the terminal case 200, namely, the front surface of the front cover part 230.

As described above, the window 231 is prepared in the front cover part 230 and a pattern part 240 is prepared below the window 231. The pattern part 240 is divided into a plurality of regions, and numbers or letters are displayed on each of the plurality of regions. That is, the pattern part 240 may include a plurality of buttons on which the numbers and letters are indicated. The pattern part 240 has a shape corresponding to a user interface displayed on the display unit 151 of the terminal body 100. Accordingly, when the pattern part 240 is divided into a A*B matrix, or includes buttons arrayed in a A*B matrix type, a user interface displayed on a region covered by the front cover part 230 in the display unit 151 may also be divided into a A*B matrix or have buttons, especially touch buttons, arrayed in a A*B matrix type. The pattern part 240 may display information about the user interface displayed on a region covered by the pattern part 240 in the display unit 151. Description about this will be provided later.

Figure 5:
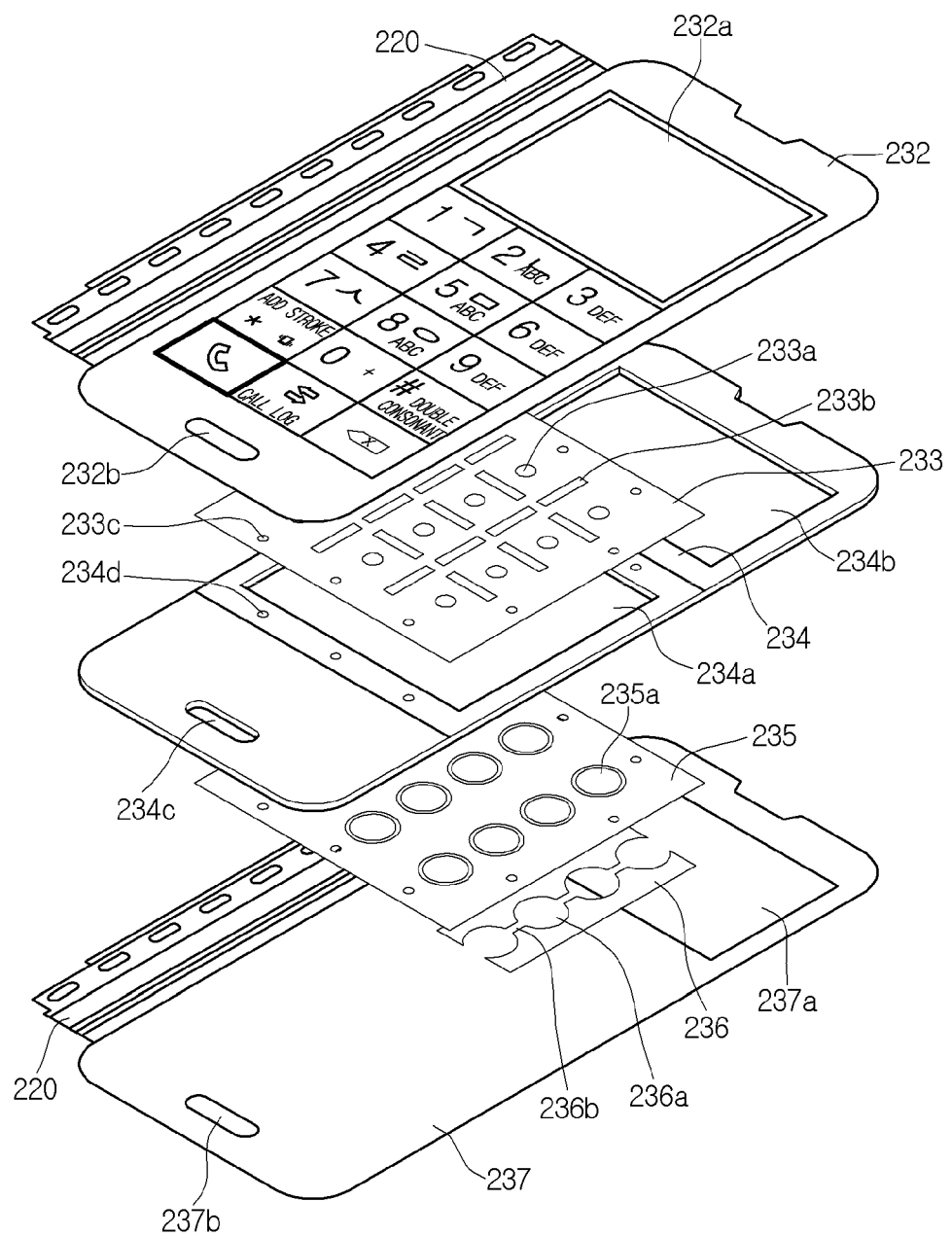
FIG. 5 is an exploded perspective view illustrating a front cover part in a terminal case according to an embodiment.
Figure 6:
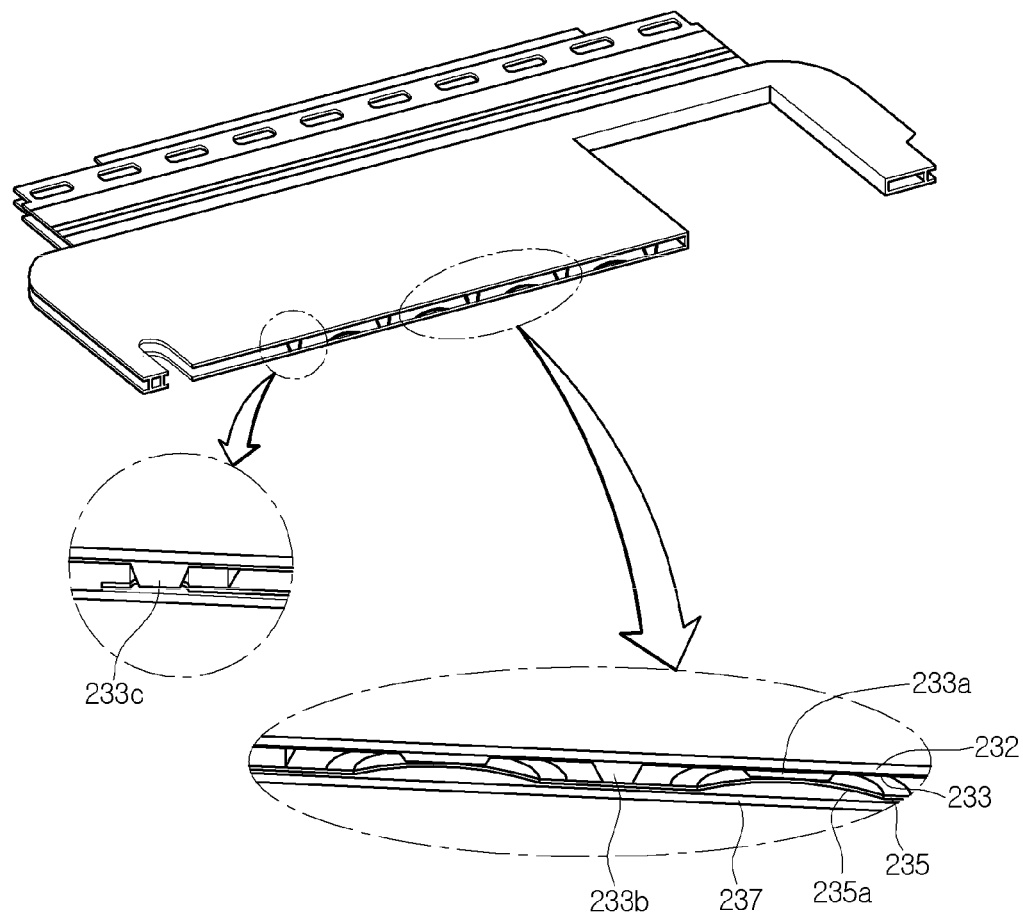
FIG. 6 is a cross-sectional perspective view of a terminal case according to an embodiment.
Figure 7:
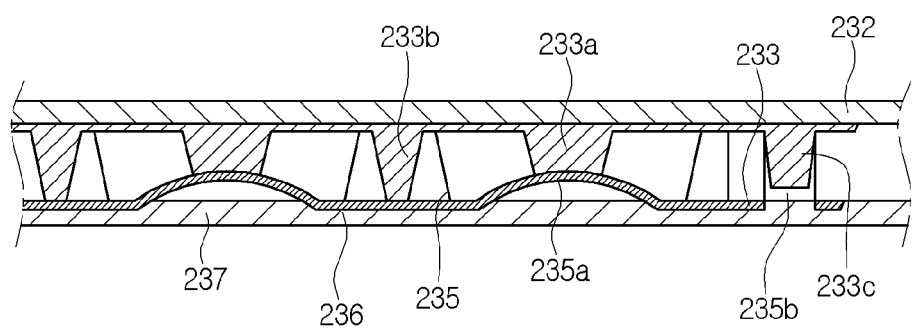
FIG. 7 is a side cross-sectional view of a terminal case according to an embodiment.

FIG. 5 is an exploded perspective view of the front cover part, FIG. 6 is a cross-sectional perspective view of a terminal case according to an embodiment, and FIG. 7 is a side cross-sectional view of a terminal case according to an embodiment. For reference, FIG. 5 illustrates a view that the front cover part 230 includes the pattern part 240, and FIG. 6 illustrates a view that the front cover part 230 does not include the pattern part 240.

Hereinafter, a structure of the front cover part 230 is described in detail with reference to FIGS. 5 to 7. In description of a configuration of the front cover part 230, referring that a configuration and another configuration are positioned to correspond to each other may mean that they are overlapped in a front and rear view.

The front cover part 230 includes a top cover 232, an actuator sheet 233, a supporting part 234, a poly dome sheet 235, an air vent part 236, and a bottom cover 237.

First, the top cover 232 forms the highest portion of the front cover part 230, namely, is positioned at the foremost side of the front cover part 230. Hereinafter, the highest portion and the foremost side should be interpreted as the same meaning, because the terms 'the highest portion' and 'the foremost side' can be selectively used according to a direction of view point. The top cover 232 may be made from leather, a synthesized resin, or other materials, but not limited thereto. The top cover 232 may be made from a material allowing a pressed point to be deformed, when a user presses the specific point on the top cover 232. That is, only the pressed point is dented toward the rear side. The top cover 232 includes a thru-hole part 232*a*. The thru-hole part 232a may be formed by cutting a part of the top cover 232. Accordingly, the thru-hole part 232a may have a shape and size corresponding to the window 231 of the front cover unit 230. This means that an internal region of the thru-hole part 232a of the top cover 232 may become the window 231 in view of the entire front cover part 230.

Furthermore, the top cover 232 includes a hard key cut part 232b. The hard key cut part 232b is formed by penetrating the top cover 232 in the depth direction (the up and down direction in FIG. 4). The hard key cut part 232b may be formed at a position corresponding to any one of hard keys 131 of the mobile terminal, for example, a position corresponding to the home key. Accordingly, the user may perform a key input by pressing the hard key 131 even in a state where the front cover part 230 covers the entire front surface of the terminal body 100.

In addition, the front surface of the top cover 230 includes the pattern part 240 as shown in FIG. 4. The pattern part 240 may be printed on the front surface of the top cover 230, but is not limited thereto. The pattern part 240 may be identical to or correspond to at least any one of user interfaces displayed on the display unit 151 of the terminal body 100. That is, the pattern unit 240 may be that a user interface on the display unit 151, which is covered by the front cover part 230 and not shown to the user, is printed on the front cover part 230. Accordingly, when the user presses any one button marked on the pattern part 240, the same effect as that a button displayed on the display unit 151 of the terminal body 100 is pressed can be obtained. This operating method will be described later.

The actuator sheet 233 is positioned on a lower portion of the top cover 232, namely, in the rear side of the top cover 232.

The actuator sheet 233 includes a plurality of pressure bumps 233a protruding towards the rear side (downward in FIGS. 5 to 7), a plurality of spacers 233b, and a plurality of coupling bumps 233c.

The pressure bumps 233a is prepared to enable domes 235a, which are to be described later, of the poly dome sheet 235 to be pressed. Accordingly, positions and the number of the pressure bumps 233a correspond to those of the domes 235a of the poly dome sheet 235. Description about this will be provided again, when the poly dome sheet 235 is described.

The spacers 233b are extended longer than the pressure bumps 233a towards the rear side (downward in FIGS. 5 to 7). The rear end portions of the spacers may normally contact with the poly dome sheet 235 to be described later. In detail, they may contact with other parts on which the domes 235a are not formed in the poly dome sheet 235. Since the spacers 233b secure spaces separated in a depth direction, the pressure bumps 233a may move towards the rear side.

The coupling bumps 233c is a configuration for coupling to the supporting part 234 to be described later and protrudes toward the rear side. The coupling bumps 233c are formed at positions corresponding to coupling grooves 234d in order to be inserted into the coupling grooves 234d of the supporting part 234 to be described later.

The supporting part 234 may be formed from a material having higher rigidity than the top cover 232 and the bottom cover 237, and play a role of shaping the front cover part 230.

The supporting part 234 includes a center cut part 234a, a thru-hole part 234b, and a hard key cut part 234c.

The center cut part 234a is formed to penetrate a portion of the center of the supporting part 234 in the depth direction (the up and down direction in FIG. 4), has a little smaller area than the poly dome sheet 234. Coupling grooves 234d are formed at the outer side of an edge of the center cut part 234a.

The thru-hole part 234b may be formed by penetrating the supporting part 234 in the depth direction (the up and down direction in FIG. 4). However, thru-hole part 234b is not limited thereto, and may be formed from a transparent material such as a transparent film.

The hard key cut part 234c is formed by penetrating the supporting part 234 in the depth direction (the up and down direction in FIG. 4). The hard key cut part 234c may be formed at a position corresponding to any one of the hard keys 131 of the mobile terminal, for example, a position corresponding to the home key. Furthermore, it may also be formed at a position corresponding to the above-described hard key cut part 232b of the top cover 232. Accordingly, the user may perform a key input by pressing a hard key (not shown) even in a state where the front cover part 230 covers the front surface of the terminal body 100.

The poly dome sheet 235 is positioned in the rear side (lower portion in FIGS. 5 to 7) of the actuator sheet 233. The poly dome sheet 235 includes the plurality of domes 235a that the centers thereof convexly protrude towards the front side (upward in FIGS. 5 to 7). The plurality of domes 235a may be separately disposed from each other in a predetermined interval. The domes 235a are prepared, as briefly described above, at the positions corresponding to the pressure bumps 233a. Here, the corresponding positions refer to positions at which the domes 235a are overlapped the pressure bumps in a front side view. Accordingly, when the pressure bumps are pressed from the top portion to the bottom portion, the pressure bumps press the corresponding domes.

Carbon coating may be performed inside the domes 235a. That is, the carbon coating may be performed at a bottom surface of the domes 235a. Accordingly, when the domes 235a are pressed by the pressure bumps 233a, shapes of the domes 235a may be deformed to cause a change of capacitance. In addition, the capacitance change is recognized by a touch sensor to allow a touch input to the mobile terminal to be performed.

The air vent part 236 is prepared in a lower portion of the poly dome sheet 235. The air vent part 236 may be provided as a type of tape having adhesion on any one side or on both sides. The air vent part 236 includes a plurality of circular parts 236a. The circular parts 236a are formed to penetrate the air vent part 236 in the depth direction. In addition, the circular parts 236a are disposed separate from each other in a predetermined interval in correspondence to the positions of the domes 235a. Furthermore, any one circular part 236a communicates with at least any one of adjacent circular parts 236a through communication parts 236b. That is, connection paths are formed between any one circular part 236a and adjacent circular parts 236a thereof, and the connection paths become the communication parts 236b. Accordingly, when the above-described domes 235a of the poly dome sheet 235 are pressed, air inside the domes 235a may be discharged into surrounding adjacent circular parts 236a through the communication parts 236b, and accordingly shapes of the domes 235a may be deformed.

On the other hand, the circular parts 236a respectively correspond to the domes included in the poly dome sheet 235. Accordingly, the number and positions of the circular parts 236a correspond to those of the domes 235a. Here, the corresponding means that each of the domes 235a is disposed to overlap each of the circular parts 236a in a view of the depth direction.

The bottom cover 237 is prepared in the rear side (the lower portion in FIGS. 5 to 7) of the air vent part 236. The bottom cover 237 is positioned at the rearmost side of the front cover part 230. Accordingly, the bottom cover 237 is disposed contactable with the display unit 151 of the mobile terminal. Hereinafter, the term 'rearmost' can be replaced to the term 'lowest' or 'lowermost' to describe the position of the bottom cover 237.

The bottom cover 237 includes a thru-hole part 237a. The thru-hole part 237a has the same shape as that of the thru-hole part 237a of the top cover 232, and is prepared at a position corresponding to each other. The thru-hole part 237a may be formed by cutting a portion of the bottom cover 237 to be penetrated in the depth direction.

The bottom cover 237 includes a hard key cut part 237b. The hard key cut part 237b is formed at a position corresponding to the hard key cut part 234c of the above-described top cover 230.

The bottom cover 237 may be formed from leather, a synthesized resin, or other materials, and the material is not limited.

Furthermore, the thru-hole part 232a of the top cover 232, the thru-hole part 234b of the supporting part 234, and the thru-hole part 237a of the bottom cover 237 are all formed transparently to allow a light to be transmitted therethrough, and form the window 231 of the front cover part 230. Accordingly, the window 231 includes the thru-hole part 232a of the top cover 232, the thru-hole part 234b of the supporting part 234, and the thru-hole part 237a of the bottom cover 237.

Hereinafter, the operation principle of the front cover part 230 having the above-described structure is briefly described.

When a user presses any one button forming the pattern part 240 of the front cover part 230, a portion pressed on the top cover 232 is deformed and pushed out toward the rear side, and presses the corresponding pressure bump 233a of the actuator sheet 233 towards the rear side.

When being pressed in the rear side, the pressure bump 233a presses the corresponding dome 235a towards the rear side.

When the dome 235a is pressed towards the rear side, air inside the dome 235a is dispersed toward adjacent domes through the air vent part 236, and the shape of the dome 235a is deformed. That is, the space inside the dome 235a gets smaller.

When the dome 235a is deformed, an amount of the air filling the inside of the dome 235a is changed to cause a change in capacitance inside the dome 235a. In addition, this capacitance change is recognized by a touch sensor included in the terminal body. That is, the same effect is obtained as that a touch panel included in the display unit 151 of the mobile terminal is touched.

Accordingly, a touch input by a user is enabled even in a state where the display unit 151 of the mobile terminal, namely, the touch panel is covered with the front covert part 230.

Hereinafter, an operating method of the mobile terminal having the above-described configuration is described with reference to FIGS. 8 and 9. That is, description is provided for an operating method of a mobile terminal to which a signal may be input even in case where a user presses the front cover part 230.

Figure 9:
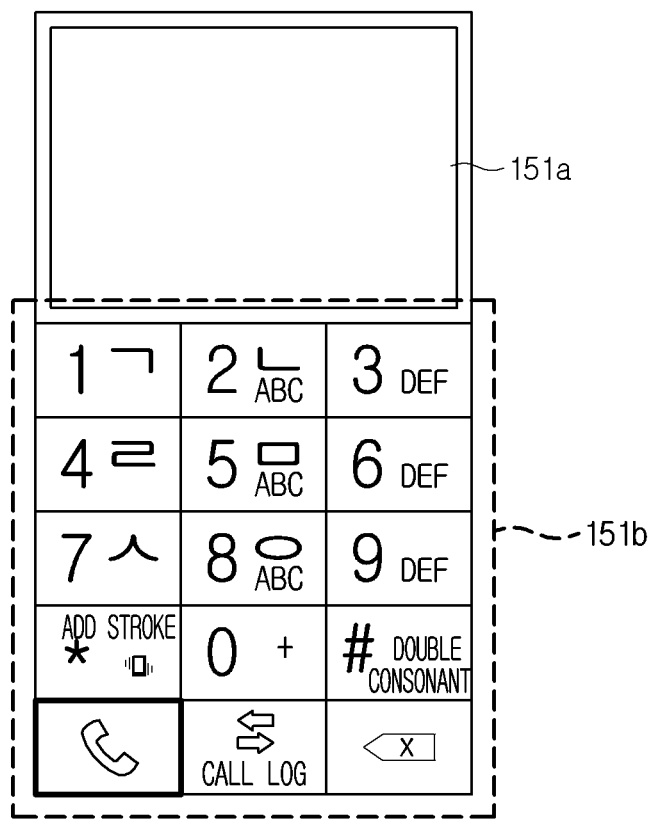
FIG. 9 illustrates an exemplary user interface provided in a closed mode.

In description about the operating method of the mobile terminal, the display unit 151 is divided into an exposed region 151a and a hidden region 151b as shown in FIG. 9. The exposed region 151a is defined to be a region corresponding to the window 231 of the front cover part 230. That is, the exposed region 151a is shown externally by the window 231, even in a state where the front cover part 230 covers the front side of the display unit 151. Furthermore, the hidden region 151b is defined as a region other than the exposed region 151a in the display unit 151, namely, a region covered by a portion other than the window 231 of the front cover part 230.

Figure 8:
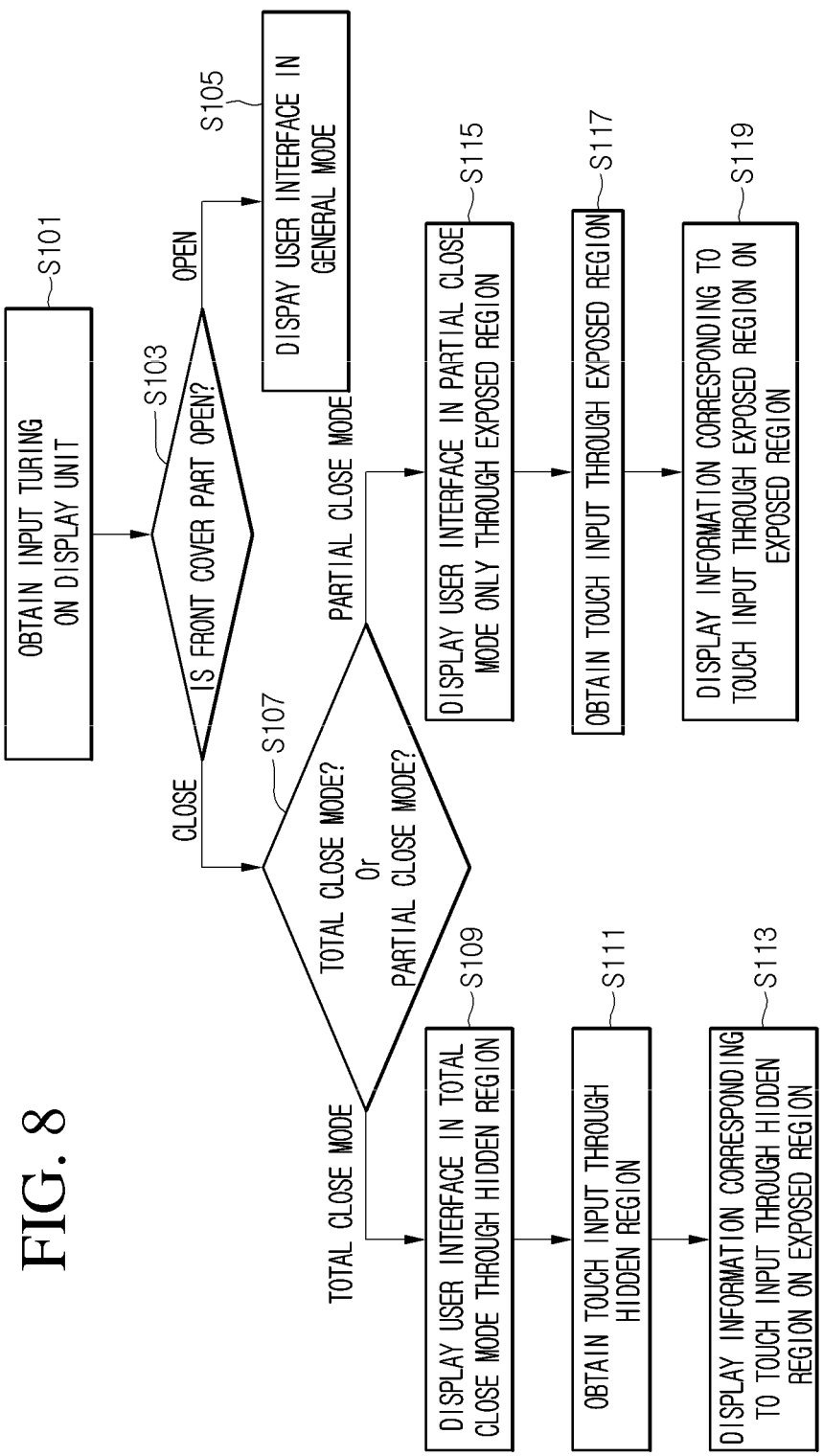
FIG. 8 is a flowchart explaining an operating method of a mobile terminal according to an embodiment.

FIG. 8 is flowchart illustrating an operating method of a mobile terminal according to an embodiment.

First, the controller 180 obtains a user input turning on the display unit 151 (operation S101). The user input turning on the display unit 151 may be, for example, an input through the hard keys 131 such as a home key or a side key, but is not limited thereto.

When the user input turning on the display unit 151 is obtained, the controller 180 determines whether the front cover part 230 of the terminal case 200 is open or closed (operation S103).

When the hard keys 131 such as a home key or a side key is pressed and a signal therefrom is delivered to the controller 180, the controller 180 determines whether the front cover part 230 of the terminal case 200 is closed to cover the front surface of the terminal or the terminal case 200 is open to expose the front surface of the terminal. Here, whether the front cover unit 230 is open or closed is determined on the basis of sensing information of the sensing unit 140. Here, the sensing unit 140 may include a proximity sensor. When proximity to the front cover part 230 is sensed by the proximity sensor, the front cover part 230 is determined as closed. When proximity to the front cover part 230 is not sensed, the front cover part 230 is determined as open. However, it may be interpreted that whether the front cover part 230 is open or closed is not limited to the determination based on the sensing information from the proximity sensor, but other means may be used.

When the front cover part 230 is determined as open, the controller 180 enters a general mode and displays a user interface in the general mode on the display unit 151 (operation S105).

The general mode means a mode in which the mobile terminal operates in case where the terminal case is not coupled. That is, it is a mode in which the mobile terminal generally operates regardless of the terminal case. In the general mode, the user interface may be displayed on the entire region of the display unit 151.

Furthermore, when the front cover part is determined as closed, the controller 180 determines whether to enter a total close mode and display a user interface in the total close mode or enter a partial close mode and display a user interface in the partial close mode (operation S107).

The user interface in the total close mode is a user interface displayed in the hidden region 151b, and may also be displayed through both of the hidden region 151b and the exposed region 151a. The user interface of the partial closed mode is a user interface displayed in only the exposed region 151a and is not displayed in the hidden region 151b.

Here, whether to enter the total close mode or the partial close mode may be determined by an input pattern of the hard key. For example, when a user performs a short press on the hard key, the user interface may be displayed only through the exposed region 151a without activating the hidden region 151b. When a user performs a long press on the hard key, the hidden region 151b is also activated and the user interface may also be displayed through the hidden region 151b. In addition, the reverse case is also possible. That is, when the short press is performed on the hard key, the total close mode may be entered, and, when the long press is performed on the hard key, the partial close mode may be entered. However, this selection is not determined only by the length of time while the hard key is pressed. Different methods other than input time of the hard key, for example, whether to press several times shortly or to press once may be used to select the total close mode or the partial close mode. However, the selection method is not limited thereto, and various methods may be used.

Furthermore, as a result of determining whether to be in the total close mode or in the partial close mode, when it is determined as the total close mode, the controller 180 displays the total close mode user interface through the hidden region 151b of the display unit 151 (operation S109).

Here, on the exposed region 151a, the user interface may be displayed or may not be displayed. In addition, in the total close mode, although only the exposed region 151a is visually observed by the user, a touch input is also possible through the hidden region 151b. FIG. 9 illustrates an example that a user interface is displayed on both the exposed and hidden regions 151a and 151b of the display unit 151. The user interface shown in FIG. 9 is a user interface for executing a phone call function.

In this state, when the user presses the hidden region 151b, the controller 180 obtains a touch input signal corresponding thereto (operation (S111).

Here, the front surface of the front cover part 230 includes the pattern unit 240 and information about the buttons or icons included in the user interface displayed in the hidden region 151b is displayed through the pattern part 240. Accordingly, although the front cover part 151b is covered by the hidden region 151b, the user may know which portion is necessary to be pressed in order to input a desired signal.

When the pattern part 240 of the front cover part 230 is pressed, the top cover 232 is pressed towards the rear side, the pressure bump 232a is pushed out towards the rear side, the pressure bump 233a again press the dome 235a towards the rear side to deform the shape thereof, and a capacitance change is recognized by the touch sensor. However, even though a configuration such as the pressure bumps 233a or the domes 235a does not exist, a touch input by a finger or a stylus pen may be recognized by the touch sensor.

When receiving the touch input signal, the controller 180 displays information corresponding to the touch input through the exposed region 151a (operation S113).

That is, letters or numbers corresponding to touch input buttons are displayed on the exposed region or an application corresponding to a touch input icon is executed.

Furthermore, in operation S107, when determining to enter the partial close mode, the controller 180 displays a user interface in a partial close mode through the exposed region 151a (operation S115). Here, the user interface is not displayed in the hidden region 151b.

In addition, when a user touches the exposed region 151a, the controller 180 obtains the input signal (operation S117).

The controller 180 displays information corresponding to the input touch signal on the exposed region 151a (operation S119).

Here, a specific application may be executed by the touch input.

In the above-described embodiment, when the front cover part 230 is determined as closed in operation S107, the controller 180 determines whether to be the total close mode or the partial close mode.

However, when obtaining a user input turning on the display unit 151, the controller 180 may omit the determining of whether to enter the total close mode or the partial close mode, unconditionally enter the total close mode, and display the user interface in the total close mode.

Hereinafter, an operating method of the terminal case and the mobile terminal according to another embodiment is described with reference to FIGS. 10 to 12.

In the present embodiment, a plurality of close modes are provided to enable a user to select, and a user interface in the selected close mode is provided to the user.

Figure 10:
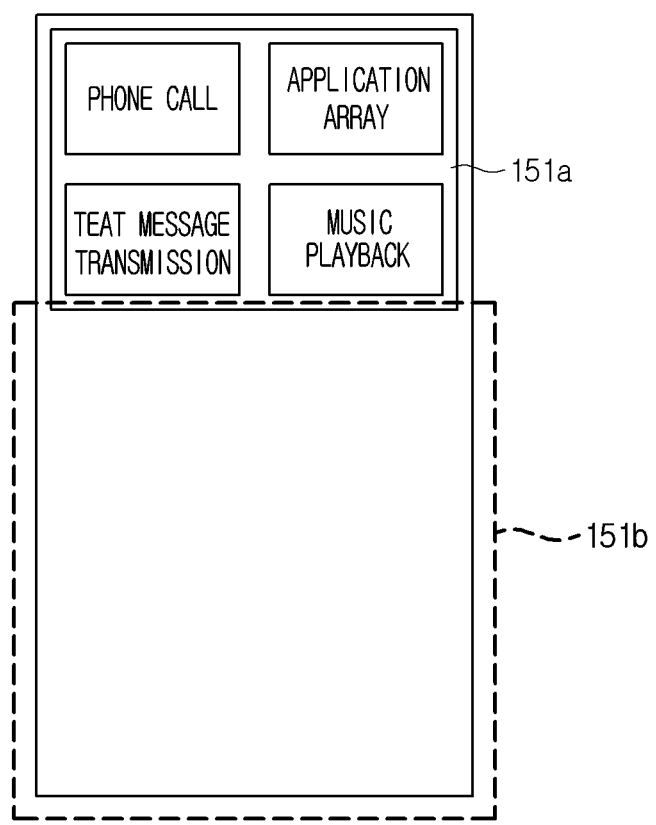
FIG. 10 illustrates an exemplary user interface in which any one of a plurality of user interfaces provided in a closed mode is selectable.

FIG. 10 illustrates an exemplary user interface that a plurality of close modes are provided to allow a user to select. Here, a portion of the plurality of close modes provided to be selectable may be the total close mode displaying the user interface only through the hidden region 151a or through all the hidden region 151a and the exposed region 151b, and another portion thereof may be the partial close mode displaying the user interface only through the exposed region 151a.

FIG. 10 illustrates a user interface displayed in the exposed region 151a and including four buttons through which the user can select any one of a phone call, a text message transmission, application array, and music playback. Here, nothing may be displayed in the hidden region 151b.

Figure 11:
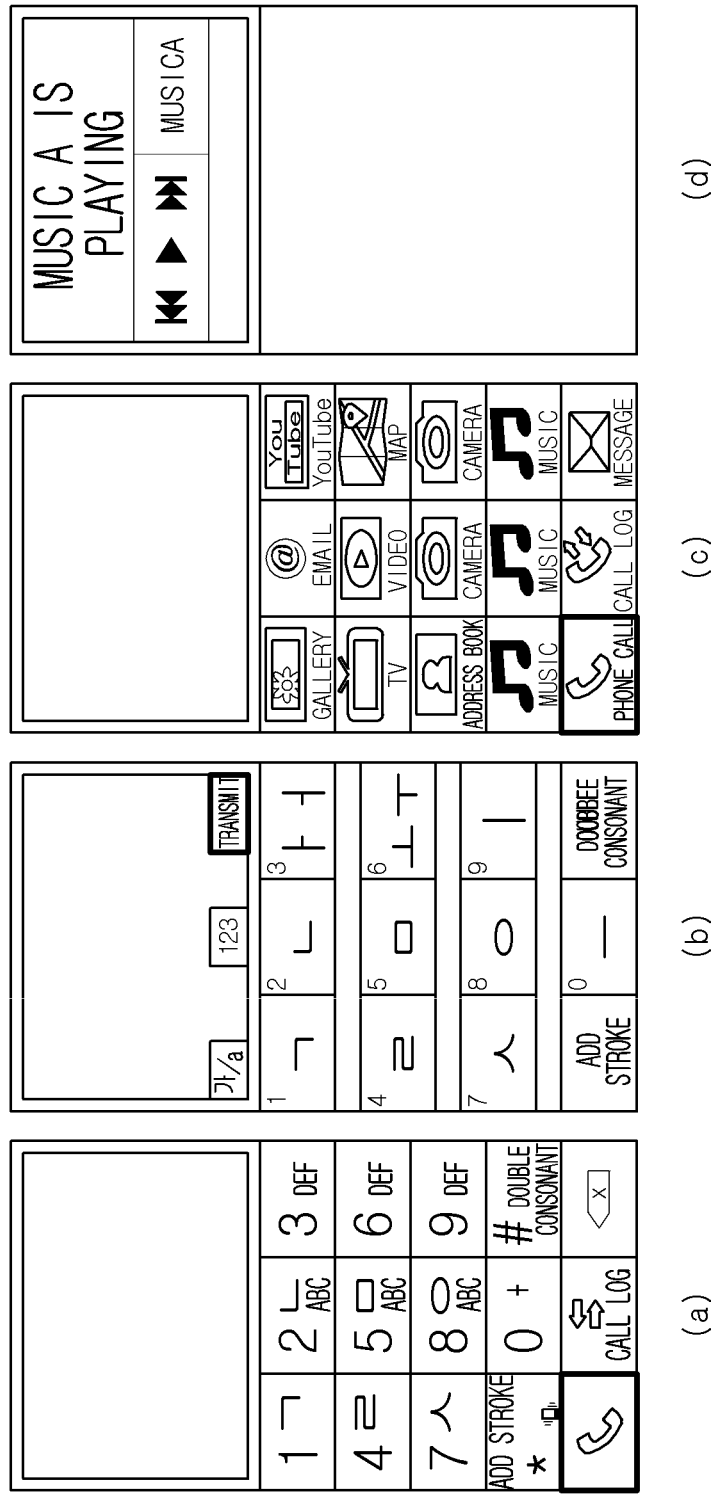
FIGS. 11A to 11D illustrate other exemplary user interfaces provided in a closed mode.
Figure 12:
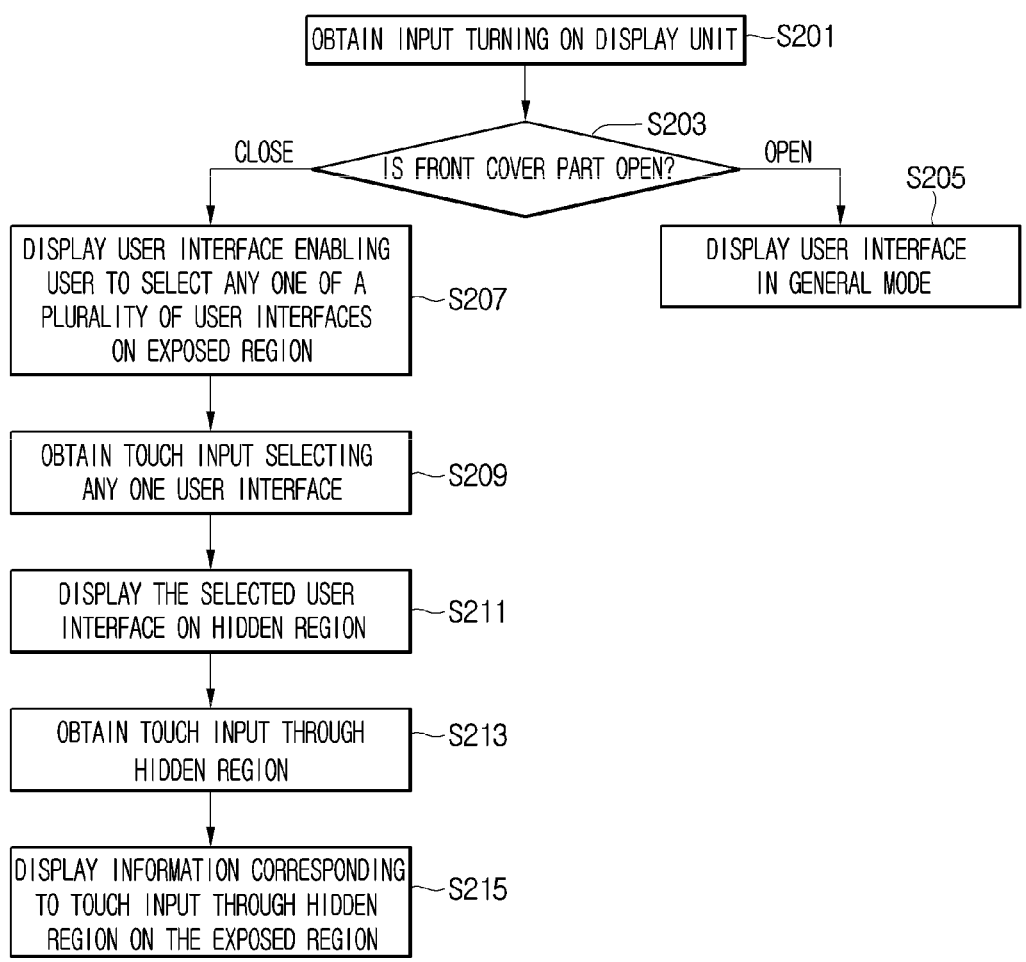
FIG. 12 is a flowchart explaining an operating method of a mobile terminal according to another embodiment.

FIG. 11 illustrates a user interface representing a case where any one of the four buttons of the user interface shown in FIG. 10 is touched.

FIG. 11A illustrates a user interface displayed when the phone call button is pressed. Number buttons, a call button, a call log button, and a backspace button are displayed in the hidden region 151b for allowing a user to make a phone call. In this case, the user interface shown on the hidden region 151b is divided to correspond to the pattern part 240 of the front cover part 230. Here, 'to correspond' means that each button included in the pattern part 240 and each button displayed on the hidden region 151b are disposed to overlap in a front side view. In addition, 'to correspond' also means that a user interface in a first close mode has region division corresponding to region division of the pattern part 240 formed on the front cover part 230. That is, when the pattern part 240 is divided into an A*B matrix or includes buttons arrayed as an A*B matrix, the user interface may also be divided into an A*B matrix or include buttons arrayed as an A*B matrix. Furthermore, information (numbers or letters) corresponding to buttons input through the pattern part 240 and the hidden region 151b may be displayed on the exposed region 151a. Here, A and B are arbitrary numbers.

FIG. 11B illustrates a user interface displayed when the text message transmission button is pressed. Letter buttons formed of consonants and vowels are displayed in the hidden region 151b for allowing a user to be able to transmit a text message. Here, the user interface on the hidden region 151b, as in the first close mode, may have region division corresponding to region division of the pattern part 240 formed on the front cover part 230. That is, when pattern part 240 is divided into an A*B matrix or includes buttons arrayed as an A*B matrix, the user interface may also be divided into an A*B matrix or include buttons arrayed as an A*B matrix.

FIG. 11C illustrates a user interface displayed when the application array button is pressed. A plurality of user-preset user application icons may be arrayed to allow a user to execute any one application. Here, positions at which the applications are arrayed respectively correspond to buttons of the pattern part 140. That is, as in the first and second close modes, the user interface displayed on the hidden region 151*b* may have region division corresponding to the region division of the pattern part 240 which is formed on the front cover part 230. That is, when the pattern part 240 is divided into an A*B matrix or includes buttons arrayed as an A*B matrix, the user interface may also be divided into an A*B matrix or include buttons arrayed as an A*B matrix.

Furthermore, information (numbers or letters) corresponding to buttons input through the pattern part 240 and the hidden region 151*b* may be displayed on the exposed region 151*a*. Alternatively, application execution information may be displayed on the exposed region 151*a*. For example, when an application related to music playback is executed, information related to the music playback may be displayed on the exposed region 151*a*.

In addition, a plurality of application icons displayed on the hidden region 151*b* may be arrayed at positions corresponding to the buttons of the pattern part 240 one by one. Alternatively, as shown in FIG. 11C, any one icon may be arrayed in plurality. That is, an application icon of a high use frequency may be arrayed in correspondence to the plurality of buttons of the pattern part 240. In this case, since the displayed application may be set by a user and the setting may be changed, the corresponding application may not be displayed on the pattern part 240. However, it is also possible that information about a part of applications is displayed on the patter part 240 and a user sets so that the corresponding applications are disposed at the corresponding positions.

FIG. 11D illustrates a user interface displayed when the music playback button is pressed. That is, when a user touch-inputs a music playback button in the user interface shown in FIG. 10, the corresponding application may be instantly executed. In addition, information about the played music may be displayed in the exposed region 151*a*.

Furthermore, when a selectable user interface in the total close mode is in plurality, only information about a part of the user interfaces is displayed on the pattern part 240, and information about rest of them may be not displayed.

In the present embodiment, only information corresponding to phone call and text message transmission is displayed on the pattern part 240, but information about the application array is not displayed on the pattern part 240. Accordingly, only numbers, letters, or icons corresponding to the user interface for the phone call and the text message transmission are displayed on the pattern part 240.

Hereinafter, an operating method of a mobile terminal according to another embodiment, which provides the user interface as shown in FIGS. 10 and 11, is described with reference to FIG. 12.

The controller 180 obtains a user input turning on the display unit 151 (operation S201).

Here, the user input turning on the display unit 151 may be performed by pressing a home key or a side key, but is not limited thereto.

When the user input turning on the display unit 151, the controller 180 determines whether the front cover part 230 of the terminal case is open or closed (operation S203).

For example, when a hard key such as the home key or the side key is pressed and a signal therefrom is delivered to the controller 180, the controller 180 determines whether the front cover part 230 of the terminal case is closed to cover the front surface of the terminal or the terminal case is open to expose the front surface of the terminal. Here, whether the front cover part 230 is open or closed may be determined based on sensing information of a proximity sensor. That is, when proximity to the front cover part is sensed by the proximity sensor, the front cover part is determined as closed, and, when proximity to the front cover part is not sensed by the proximity sensor, the front cover part is determined as open. However, whether the front cover part 230 is open or closed is not always determined on the basis of the sensing information from the proximity sensor, but may be determined by using other means.

When the front cover part 230 is determined as open, the controller 180 enters a general mode and displays a user interface in the general mode through the display unit 151 (operation S205).

The general mode means a mode in which the mobile terminal operates in case where the terminal case is not coupled. That is, it is a mode in which the mobile terminal generally operates regardless of the terminal case. In the general mode, the user interface may be displayed on the entire region of the display unit 151.

Furthermore, when the front cover part is determined to be closed, the controller 180 displays, on the exposed region 151*a*, a user interface in which any one user interface may be selected from among a plurality of user interfaces (operation S207).

For example, a user interface may be displayed where any one of a plurality of user interfaces including at least any one of a phone call, text message transmission, application array, and music playback.

Furthermore, the controller 180 obtains a user input selecting any one user interface through the exposed region (operation S209).

The controller 180 displays the selected user interface on the hidden region 151*b* (operation S211).

That is, the user interface of the selected total close mode is displayed on the hidden region 151*b*. Here, the displayed user interface, as shown in FIGS. 11A to 11C, is provided to receive a touch input signal through the hidden region 151*b*. However, the user interface in the partial close mode, as shown in FIG. 11D, may be displayed only through the exposed region 151*a*.

In a state where the user interface is displayed in the hidden region 151*b*, when the user presses the pattern part 240 to touch-input any one part on the hidden region 151*b*, the controller 180 obtains the touch input through the hidden region 151*b* (operation S213).

When the user presses a predetermined button of the pattern part 240, an effect is obtained that a corresponding position on the display unit 151 is touched. This is because, when the pattern part 240 of the front cover part 230 is pressed, the top cover 232 is pressed towards the rear side, the pressure bump 233*a* is pushed out towards the rear side, the pressure bump 233*a* again press the dome 235*a* towards the rear side to deform the shape thereof, a capacitance change therefrom is recognized by the touch sensor, and the touch input is recognized.

Furthermore, when the controller 180 obtains a touch input through the hidden region, information corresponding to the touch input is displayed in the exposed region 151*a* (operation S215).

For example, in a state where a phone call user interface is displayed, when the user presses numbers, corresponding numbers are displayed in the exposed region. When the user presses the entire phone number and a call button, a phone call starts and a call connection situation is displayed on the exposed region.

In addition, in a state where a text message transmission user interface is displayed, when the user presses letters, corresponding letters are displayed in the exposed region. When the user presses all letters desired to be transmitted and a transmission button, the text message is transmitted and a text message transmission situation and a result thereof are displayed in the exposed region.

In addition, in a state where a user interface having a plurality of icons for executing applications is displayed, when the user presses a position corresponding to any one application, a corresponding application is executed and information about the execution of the corresponding application may be displayed in the exposed region.

Furthermore, when a button for executing any one of the plurality of applications shown in FIG. 10C is displayed in operation S207, the corresponding application may be further rapidly executed.

For example, a music playback application is displayed in operation S107 and also in operation S211. Accordingly, in order to further rapidly execute any one of the plurality of applications included in the application array user interface, the one application may be allowed to be displayed in operation S107.

According to the terminal case and the mobile case, user convenience can be improved because a touch input is enabled through a part that a front surface is covered even in case where the front surface of the mobile terminal is covered with the terminal case.

Figure 13:
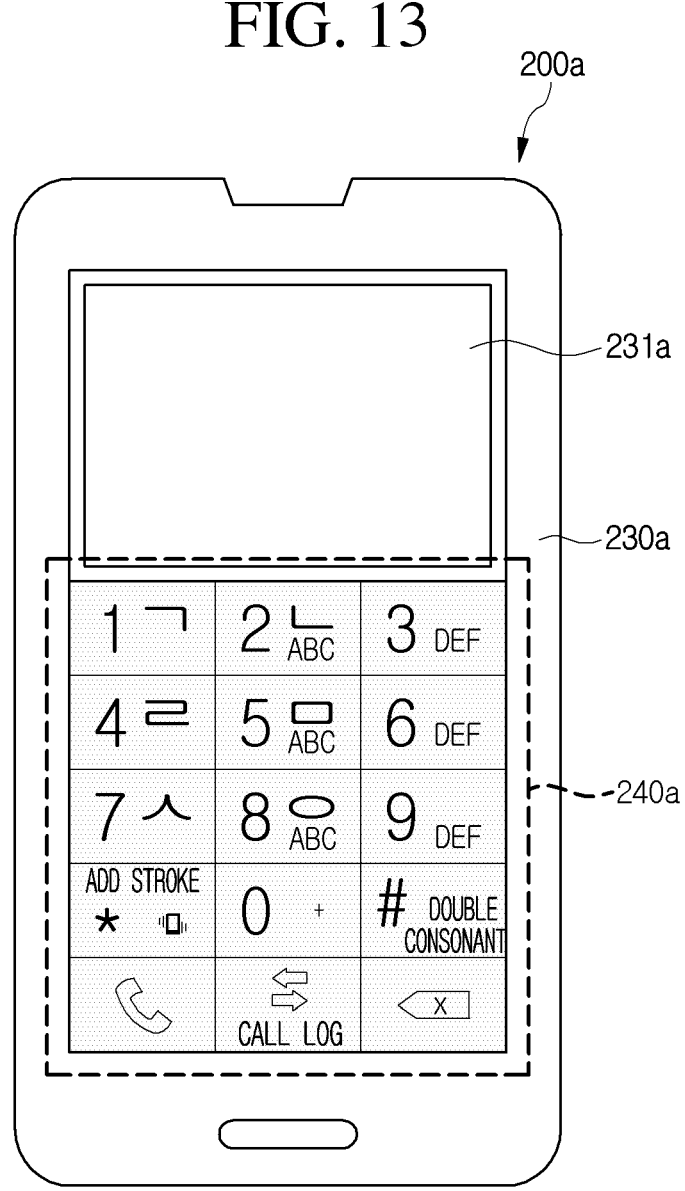
FIG. 13 is a plan view illustrating another exemplary front cover part of a terminal case.

FIG. 13 illustrates another shape of the front cover part 230a.

The pattern part 240a of the front cover part 230a may be formed to have a structure allowing a light to be transmitted as shown in FIG. 13. That is, the pattern part may have a structure allowing a user interface displayed on the display unit 151 to be shown to the user, but not have a printed shape corresponding to the hidden region.

For this, the pattern part 240a may be formed from a material allowing a light to be transmitted. The pattern part 240a may have lower light transmittance than a window 231a. The window 231a may be a thru-hole or a transparent window by coupling the transparent film sheet to the thru-hole.

In addition, a light emitted from the display unit 151 may be allowed to be transmitted through the entire pattern part 240a, or through a part of the pattern part 240a.

For example, only boundary portions of buttons forming the pattern part 240a may be allowed to transmit a light by allowing only a plurality of straight line parts dividing the pattern part 240a to transmit the light. Alternatively, an effect that numbers or letters displayed on the pattern part 240a emit lights may also be obtained by allowing portions corresponding to the numbers or the letters displayed on the pattern part 240a to transmit the lights.

Figure 14:
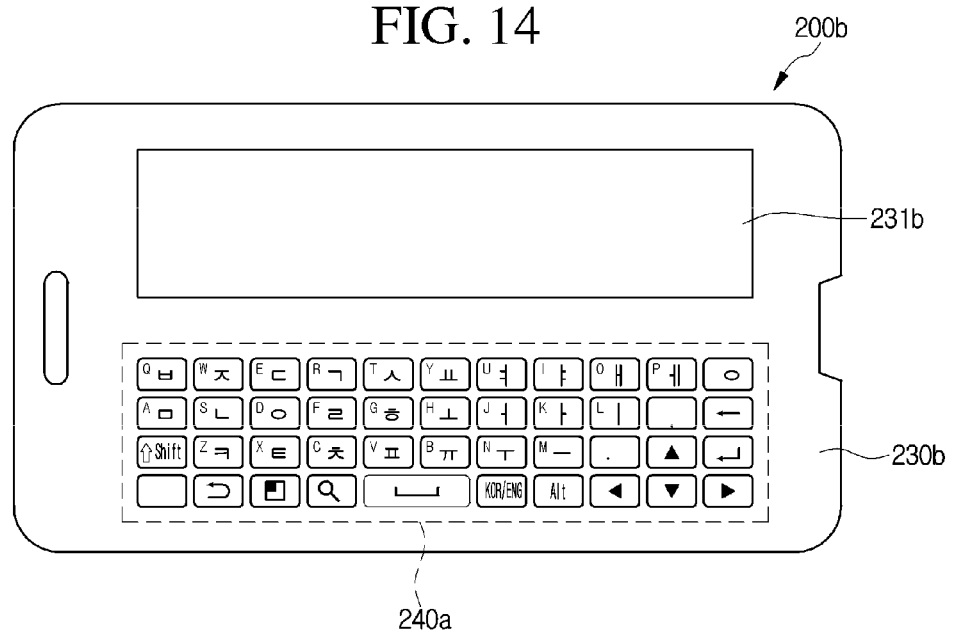
FIG. 14 is a plan view illustrating another exemplary front cover part of a terminal case.

FIG. 14 illustrates the front surface of the terminal case 200b according to another embodiment. The terminal case 200b according to the present embodiment includes a terminal coupling part (not shown) from which the mobile terminal is detachable, and a front cover part 230b coupled in a foldable way to the terminal coupling part and able to cover the front surface of the display unit of the mobile terminal. The front surface of the front cover part 230b includes a pattern part 240b. In addition, the front cover part 230b includes a window 231b. The window 231b may be a thru-hole or a transparent window by coupling the transparent film sheet to the thru-hole.

A basic configuration and operation principle of the terminal case 200b shown in FIG. 14 are the same as those of the embodiment described with reference to FIGS. 1 to 11.

However, there is a difference in that the pattern part 240b may have a shape of a QWERTY keyboard and the window 231a is formed to be long in a horizontal direction.

When the terminal case 200b has this configuration, a user interface displayed in the hidden region may include a QWERTY keyboard corresponding to the shape of the pattern part 240b.

Since descriptions about internal structure and an operation principle of the front cover part 230b, and an operating method of a mobile terminal to which this front cover part 230b is coupled are almost same as those of the above-described embodiments, repetitive descriptions about this will be omitted.

According to the embodiments, various functions of a mobile terminal can be executed through a touch input without opening a terminal case.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a terminal body comprising a front surface including a touch screen, and a rear surface opposite the front surface;
a sensor that senses a terminal case; and
a controller that controls the touch screen,
wherein the terminal case is detachably coupled to the terminal body, the terminal case comprising a back covering part that covers the rear surface of the terminal body, and a non-transparent front covering part that selectively covers the front surface of the terminal body, the front covering part exposing a portion of the touch screen without covering by the front covering part and hiding from view the remaining portion of the touch screen by the front covering part when the front covering part is covering the front surface of the terminal body,
wherein the sensor senses the proximity of the front covering part relative to the front surface of the terminal body and the controller determines whether the front covering part is closed, such that the front covering part is covering the front surface of the terminal body, or open,
wherein when the controller determines that the front covering part is closed, the controller displays information only on the exposed portion of the touch screen, including a plurality of user selectable user interfaces,
wherein when the front covering part covers the front surface of the terminal body, a portion of the touch screen is hidden by the front covering part,
wherein the non-transparent front covering part includes a plurality of non-transparent buttons that align with the hidden part portion of the touch screen when the front covering part covers the front surface of the terminal body, wherein the hidden part portion of the touch screen receives an input when one of the plurality of non-transparent buttons is manipulated, and wherein the controller controls the touch screen to display information, corresponding to the received input, only on the exposed portion of the touch screen.

2. The mobile terminal according to claim 1 further comprising a transparent film covering the exposed portion of the touch screen.

3. The mobile terminal according to claim 1, wherein the front covering part comprises:
   a top cover;
   a bottom cover;
   a poly dome sheet positioned between the top and bottom covers, and
   a pattern part that includes a plurality of buttons,
   wherein the poly dome sheet comprises a plurality of domes protruding convexly towards the top cover, and the plurality of domes are disposed at positions corresponding to the plurality of buttons in the pattern part.

4. The mobile terminal according to claim 3, wherein each of the plurality of domes comprises a carbon coated bottom surface.

5. The mobile terminal according to claim 3 further comprising an actuator sheet between the poly dome sheet and the front covering part, wherein the actuator sheet comprises a plurality of pressure bumps protruding towards the poly dome sheet.

6. The mobile terminal according to claim 5, wherein the actuator sheet further comprises spacers protruding towards the poly dome sheet at positions between adjacent domes.

7. The mobile terminal according to claim 3 further comprising an air vent part disposed between the poly dome sheet and the bottom cover,
   wherein the air vent part comprises:
   a plurality of circular parts; and
   a plurality of communicating parts connecting the plurality of circular parts that are adjacent to each other in any one direction.

8. The mobile terminal according to claim 7, further comprising a supporting part disposed between the top cover and the poly dome sheet to support the poly dome sheet.

9. The mobile terminal according to claim 3, wherein the pattern part is printed on the front covering part.

10. The mobile terminal of claim 1, wherein the front covering part further comprises a pattern part, and wherein when the controller determines that the front covering part is closed, the controller displays, on a portion of the touch screen hidden by the front covering part, a selected one of the plurality of user interfaces, and in response to a touch input applied to the pattern part, received through the selected user interface displayed on the hidden portion of the touch screen, the controller further displays, on the exposed portion of the touch screen, information corresponding to the touch input.

11. The mobile terminal according to claim 1, wherein at least one of a number and a letter is indicated on each of the plurality of non-transparent buttons.

12. An operating method of a mobile terminal that is coupled to a terminal case which selectively covers a touch screen on a front surface of the mobile terminal, the terminal case having a non-transparent front covering part that exposes a first portion of the touch screen through an opening in the front covering part and hides a second portion of the touch screen when the front covering part of the terminal case is covering the front surface of the mobile terminal, wherein the non-transparent front covering part includes a plurality of non-transparent buttons that align with the hidden portion of the touch screen when the front covering part is covering the front surface of the mobile terminal, the operating method comprising:
   obtaining a signal to turn on the touch screen;
   sensing the proximity of the front covering part relative to the front surface of the mobile terminal;
   determining whether the front covering part is open or closed based on the proximity of the covering part relative to the front surface of the mobile terminal; and
   wherein when it is determined that the front covering part is closed,
   displaying information only on the exposed portion of the touch screen including a plurality of user selectable user interfaces;
   receiving an input through the hidden portion of the touch screen in response to one of the plurality of non-transparent buttons being manipulated, and
   displaying information, corresponding to the receiving input, only on the exposed portion of the touch screen.

13. The operating method of claim 12, wherein determining whether the front covering part is in the total close mode or in the partial close mode is based on an input pattern of a hard key located on the front covering part.

14. The mobile terminal of claim 12, wherein the front covering part further comprises a pattern part and wherein when the controller determines that the front covering part is in the total close mode and the sensor detects a touch input applied to the pattern part, received through the user interface displayed on the hidden portion of the touch screen, the controller further displays, on the exposed portion of the touch screen, information corresponding to the touch input.

\* \* \* \* \*